United States Patent [19]

Mangtani

[11] Patent Number: 5,825,641
[45] Date of Patent: Oct. 20, 1998

[54] CIRCUIT FOR SENSING INDIVIDUAL LEG CURRENT IN A MOTOR CONTROLLER USING RESISTIVE SHUNTS

[75] Inventor: Vijay Mangtani, Playa Del Ray, Calif.

[73] Assignee: International Rectifier Corporation, El Segundo, Calif.

[21] Appl. No.: 13,239

[22] Filed: Jan. 26, 1998

Related U.S. Application Data

[60] Provisional application No. 60/036,053 Jan. 27, 1997.
[51] Int. Cl.⁶ .................................................. H02M 7/5387
[52] U.S. Cl. .......................... 363/98; 318/254; 318/801
[58] Field of Search ........................ 363/97, 98, 131, 363/132; 318/254, 722, 800, 801, 802, 803; 361/93

[56] References Cited

U.S. PATENT DOCUMENTS

| | | | |
|---|---|---|---|
| 4,777,579 | 10/1988 | Jahns et al. | 363/98 |
| 5,123,746 | 6/1992 | Okado | 363/98 X |
| 5,495,154 | 2/1996 | Carobolante | 318/254 |
| 5,764,466 | 6/1998 | Mangtani et al. | 361/93 X |

*Primary Examiner*—Peter S. Wong
*Assistant Examiner*—Y. J. Han
*Attorney, Agent, or Firm*—Ostrolenk, Faber, Gerb & Soffen, LLP

[57] ABSTRACT

A motor controller inverter circuit with resistive shunts for sensing the current flowing through individual legs of the motor controller. The circuit of the invention allows the use of a single monolithic three-phase driver by providing, in addition to a shunt resistor between the emitter pin of each low side IGBT and ground, an emitter return resistor between the emitter pin of each low side IGBT and the common $V_{SO}$ pin of the three-phase driver. The respective voltages developed across the shunt resistors can be sensed to determine the current flowing through the individual legs of the motor controller circuit.

4 Claims, 3 Drawing Sheets

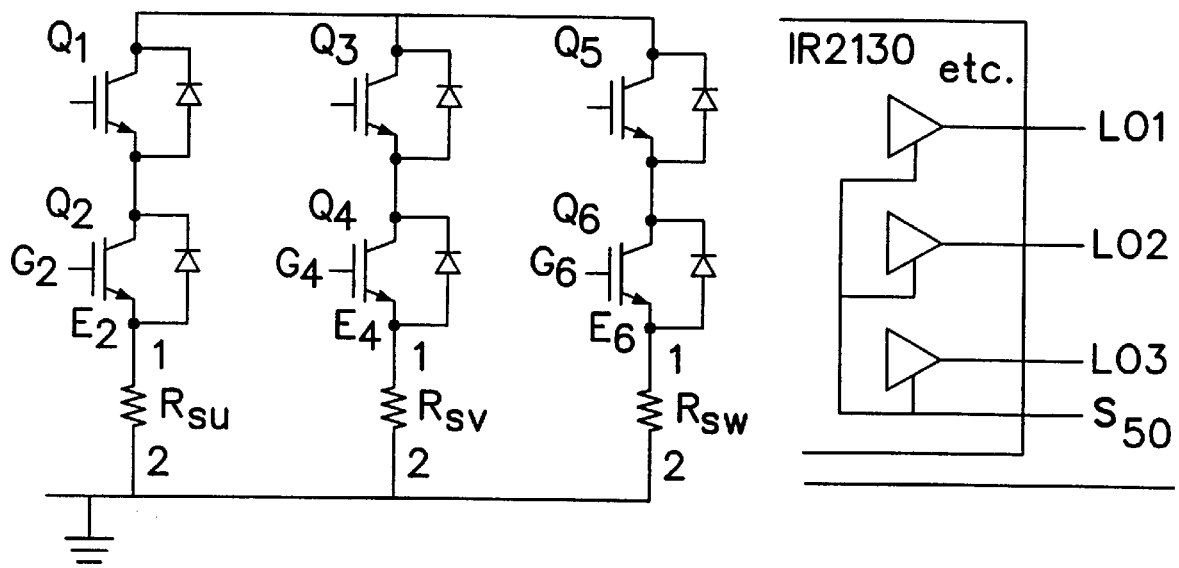
FIG. 1A
PRIOR ART
FIG. 1B
PRIOR ART
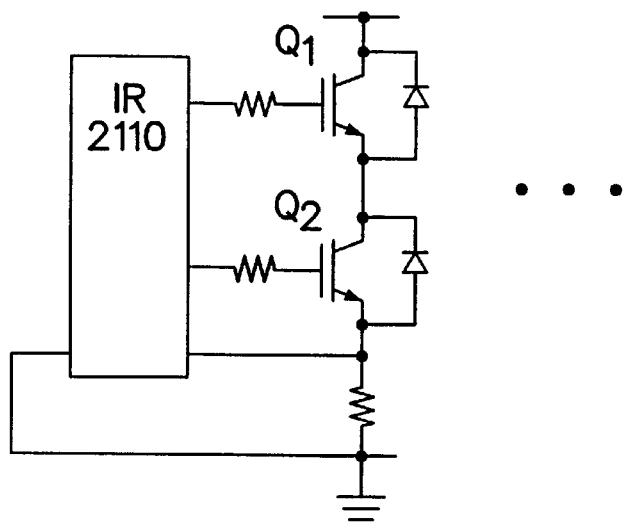
FIG. 2
PRIOR ART

CIRCUIT FOR SENSING INDIVIDUAL LEG CURRENT IN A MOTOR CONTROLLER USING RESISTIVE SHUNTS

This application claims the benefit of U.S. Provisional Application Ser. No. 60/036,053, filed Jan. 27, 1997.

BACKGROUND OF THE INVENTION

1. Field of the Invention:

The present invention relates to motor controller inverter circuits and, more specifically, to a motor controller inverter circuit with resistive shunts for sensing the current flowing through individual legs of the motor controller.

2. Description of the Related Art:

A typical motor controller circuit is shown in FIG. 1A, including three high side transistors $Q_1$, $Q_3$, $Q_5$ and three low side transistors $Q_2$, $Q_4$, $Q_6$. The transistors are typically insulated gate bipolar transistors (IGBTs), the gates of which are driven in three phase fashion by a control integrated circuit chip such as shown in FIG. 1B (i.e., output LO1 of the chip is connected to $G_2$; output LO2 is connected to $G_4$, and output LO3 is connected to $G_6$).

For certain applications, it is desired to sense the individual leg current of motor controller inverter circuits for various purposes. An economical method for sensing individual leg current, as shown in FIG. 1A, is to use resistive shunts between the emitter of an IGBT and circuit ground.

However, three-phase gate drivers are ordinarily designed with a common reference point (i.e. return path) for the low side IGBT emitters. For example, as shown in FIG. 1B, the International Recitifer IR2130 gate driver IC has a common pin $V_{SO}$, which would be normally connected to $E_2$, $E_4$ and $E_6$, thus shorting pin 1 of $R_{SU}$, $R_{SV}$ and $R_{SW}$ and thereby not allowing current sensing.

If the common pin is tied to pin 2 of $R_{SU}$, $R_{SV}$ and $R_{SW}$, as shown in FIG. 3 (which shows the first leg only), the shunt resistors ($R_{SU}$ in FIG. 1B) become part of the gate drive circuit. This implementation is undesirable as it adds the resistance and inductance of $R_{SU}$ into the gate drive circuit of $Q_2$ (similarly, the resistance and inductance of $R_{SV}$ and $R_{SW}$ are added into the gate dirve circuit of $Q_4$ and $Q_6$, respectively).

At turn on, the inductance of $R_{SU}$ opposes the gate drive current, thus slowing down turn on and increasing turn on loss.

During conduction, the voltage drop across $R_{SU}$ reduces the effective gate drive voltage, thus increasing conduction losses (however, if the voltage drop across $R_{SU}$ is the order of 200 mV, the increase in conduction losses is not significant).

At turn off, the inductance of $R_{SU}$ opposes removal of gate drive and increases turn off losses.

Also, the inductance of the shunt $R_{SU}$ tends to cause deterioration of gate drive quality due to the possibility of oscillations with device capacitance (of the low side transistor—$Q_2$ in FIG. 1B) and with the parasitic capacitance in the circuit.

One known way to sense individual leg current while also avoiding the above-noted disadvantages is to use individual half bridge drivers such as International Rectifier IR2110, IR2112 or IR2113 ICs, which have separate return paths for the low side emitters. FIG. 2 shows one leg of this known scheme for sensing individual leg current. However, it is preferable to use a single monolithic three-phase driver due to the advantages offered by high level of integration.

SUMMARY OF THE INVENTION

The present invention overcomes the problems of the prior art while also allowing the use of a single monolithic three-phase driver by providing, in addition to a shunt resistor between the emitter pin of each low side IGBT and ground, an emitter return resistor connected between the emitter pin of each low side IGBT and the common $V_{SO}$ pin of the three-phase driver. The respective voltages developed across the shunt resistors can be sensed to determine the current flowing through the individual legs of the motor controller circuit.

Other features and advantages of the present invention will become apparent from the following description of the invention which refers to the accompanying drawings.

BRIEF DESCRIPTION OF THE DRAWINGS

FIG. 1A shows a prior art circuit for sensing the individual leg current in an inverter using resistive shunts between the emitter of each IGBT and circuit ground; FIG. 1B shows the output circuitry of an IR2130 three-phase driver IC and its associated common ground pin $V_{SO}$.

FIG. 2 shows one leg of an inverter circuit using individual half-bridge driver ICs, such as the IR2110, which have separate return paths for the low side IGBT emitter.

DETAILED DESCRIPTION OF THE PREFERRED EMBODIMENT

Figure 3:
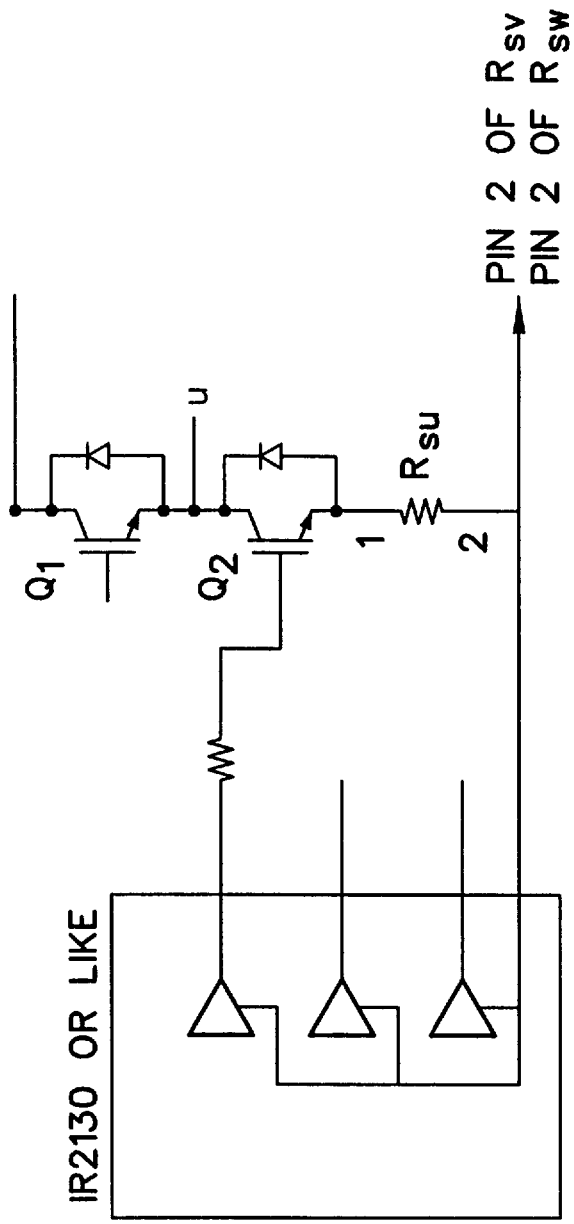
FIG. 3 shows pin 2 of $R_{SU}$, $R_{SV}$, $R_{SW}$ tied to the $V_{SO}$ pin of an IR2130 IC (only one leg shown).
Figure 4:
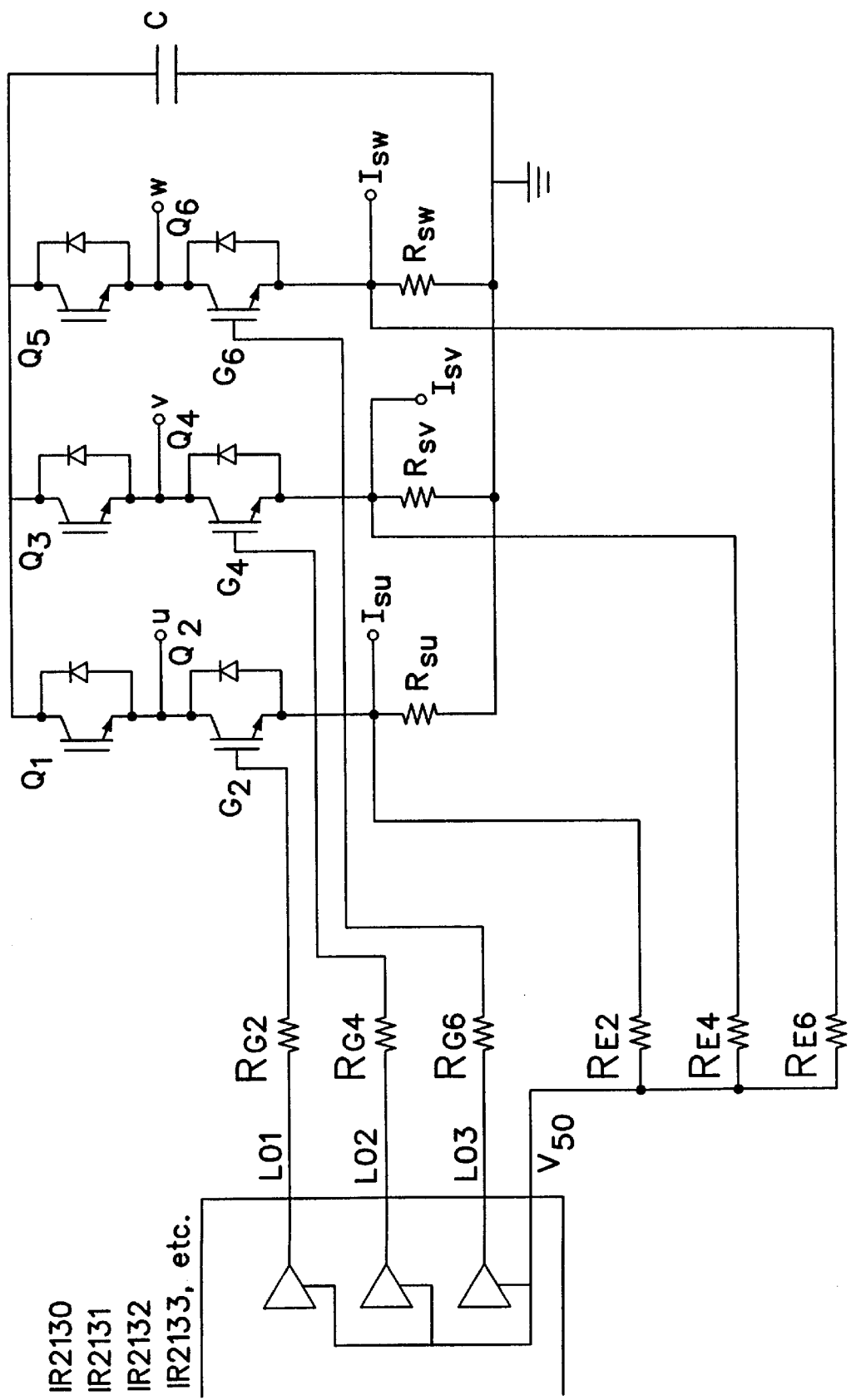
FIG. 4 shows the circuit of the present invention in which emitter return resistors are added between the emitter pin of each low side transistor and the $V_{SO}$ pin of the driver IC.

Referring to FIG. 4, in accordance with present invention, the gates $G_2$, $G_4$ and $G_6$ of the low side transistors $Q_2$, $Q_4$ and $Q_6$ in a three phase motor controller circuit are driven, through gate resistors $R_{G2}$, $RG_4$, $R_{G6}$, by a single three-phase integrated circuit chip, such as the IR2130, IR2131, IR2132, and IR2233 integrated circuit chips sold by International Rectifier Corporation of El Segundo, Calif., USA. Gate resistors $R_{G2}$, $R_{G4}$, $R_{G6}$ typically have a resistance value ranging from 1 Ω to about 200 Ω. In addition to providing shunt resistors $R_{SU}$, $R_{SV}$ and $R_{SW}$, having a resistance value of between about 5 Ω to about 150 Ω, between the emitter of each low-side IBGT emitter and ground, the emitters are connected to the common $V_{SO}$ pin of the three-phase integrated circuit driver chip through respective emitter return resistors $R_{E2}$, $R_{E4}$, and $R_{E6}$.

The respective voltages developed across the shunt resistors $R_{SU}$, $R_{SV}$ and $R_{SW}$ can be sensed at nodes $I_{SU}$, $I_{SV}$ and $I_{SW}$, respectively, the sensed voltages representing the current flowing through the individual legs of the motor controller circuit. The emitter return resistors $R_{E2}$, $R_{E4}$, and $R_{E6}$ of the present invention, which have a preferred resistance value ranging from about 2 Ω to about 15 Ω, are necessary to provide isolation between the nodes $I_{SU}$, $I_{SV}$ and $I_{SW}$.

The circuit of the present invention provides the following advantages:

1. Current sensing shunts are removed from the current path of the gate circuit, thus avoiding the problem of increased switching losses and the possibility of gate drive quality deterioration discussed above.

2. A three-phase monolithic integrated circuit driver chip with a high level of integration may be used, overcoming the increased part count and the lower level of integration involved with the prior art solution of providing individual half-bridge driver Ics discussed above.

3. Gate driver ICs with multiple internal driver circuits and a single emitter return pin for low side drivers, such as the IR2130, IR2131, IR2132, IR2233, can be used effectively with multiple shunts for sensing low side device currents.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A circuit for sensing leg current in a three-phase motor controller circuit, said motor controller circuit including three high side transistors connected in series, respectively, with three low side transistors, each of said series connected high side and low side transistors comprising one leg of the three-phase motor controller circuit, each of said high side and low side transistors having an emitter and a gate, the gates of each of said three low side transistors being driven by a single control integrated circuit chip, said control integrated circuit chip including a common $V_{SO}$ pin, said circuit for sensing leg current comprising:

three shunt resistors disposed, respectively, between the emitters of each of said three low side transistors and ground; and three emitter return resistors disposed, respectively, between the emitters of each of said low side transistors and the common $V_{SO}$ pin of said control integrated circuit chip;

wherein the voltage across each of said three shunt resistors corresponds, respectively, to the current flowing through each of the legs of said three-phase motor controller circuit.

2. The circuit as recited in claim 1, wherein said high side and low side transistors comprise IGBTs.

3. The circuit as recited in claim 1, wherein said single control integrated circuit chip comprises a three-phase monolithic driver IC.

4. The circuit as recited in claim 1, wherein a node is provided between the emitter of each said low side transistor and the respective shunt resistor for measuring the respective voltage across the shunt resistor representing the current flowing through the respective shunt resistor.

* * * * *